Figure 1:
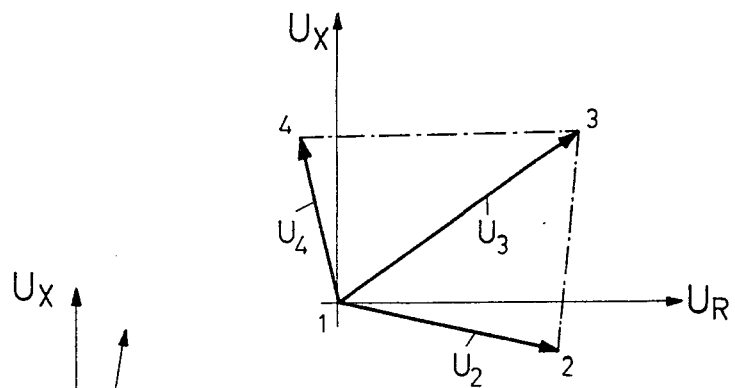

United States Patent [19]

De Mesmaeker

[11] 4,230,982
[45] Oct. 28, 1980

[54] PROCESS AND DEVICE FOR SHORT-CIRCUIT MONITORING OF ELECTRICAL LINES

[75] Inventor: Ivan De Mesmaeker, Fislisbach, Switzerland

[73] Assignee: BBC Brown, Boveri & Company, Limited, Baden, Switzerland

[21] Appl. No.: 953,637

[22] Filed: Oct. 23, 1978

[30] Foreign Application Priority Data

Oct. 28, 1977 [CH] Switzerland ............... 13123/77

[51] Int. Cl.$^3$ ............................................. G01R 31/08
[52] U.S. Cl. .............................................................. 324/52
[58] Field of Search ............................................. 324/51, 52

[56] References Cited
U.S. PATENT DOCUMENTS

| | | | |
|---|---|---|---|
| 3,354,389 | 11/1967 | Hordosi ................................. 324/73 |
| 3,467,858 | 9/1969 | Burnett ................................. 324/52 |
| 3,600,673 | 8/1971 | Kohke ................................... 324/51 |
| 3,676,739 | 7/1972 | Neuhouser ............................ 324/51 |
| 3,699,498 | 10/1972 | Hardesty ........................... 339/64 M |
| 3,723,864 | 3/1973 | Ricard ................................... 324/52 |
| 3,755,711 | 8/1973 | Fendt .................................... 324/51 |
| 3,800,215 | 3/1974 | Souillard .............................. 324/52 |
| 3,860,316 | 1/1975 | Hardesty ............................ 339/91 R |
| 4,095,172 | 6/1978 | Strand ................................... 324/51 |

Primary Examiner—Michael J. Tokar
Attorney, Agent, or Firm—Werner W. Kleeman

[57] ABSTRACT

Short-circuits are monitored between a measurement point and short-circuit located along an electrical line. Phase detection between voltage and current along the line permits signal value comparison with a threshold value to produce a triggering signal in the event of short-circuit occurance.

3 Claims, 7 Drawing Figures

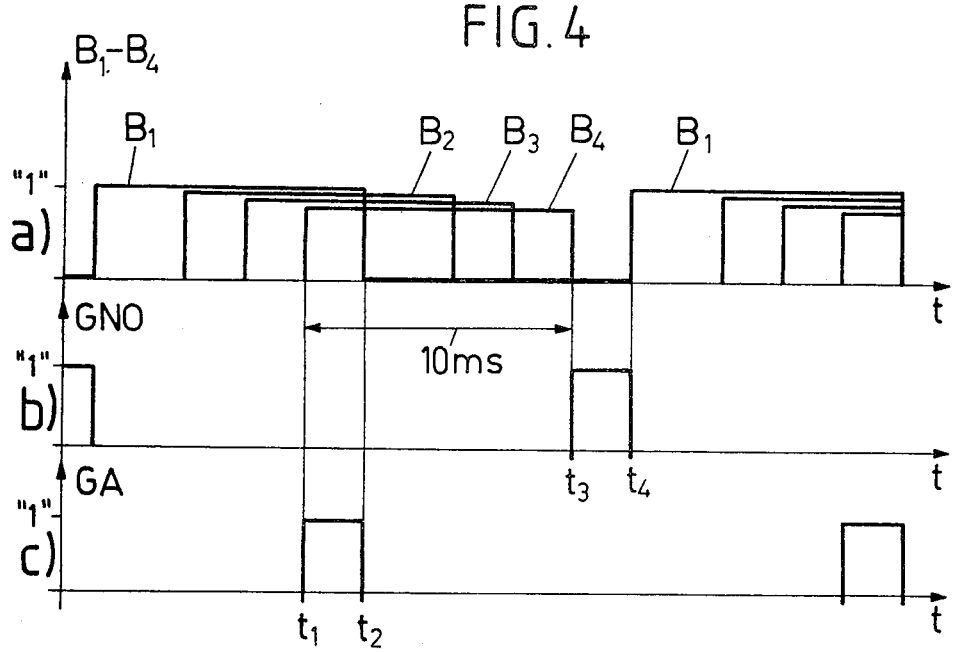
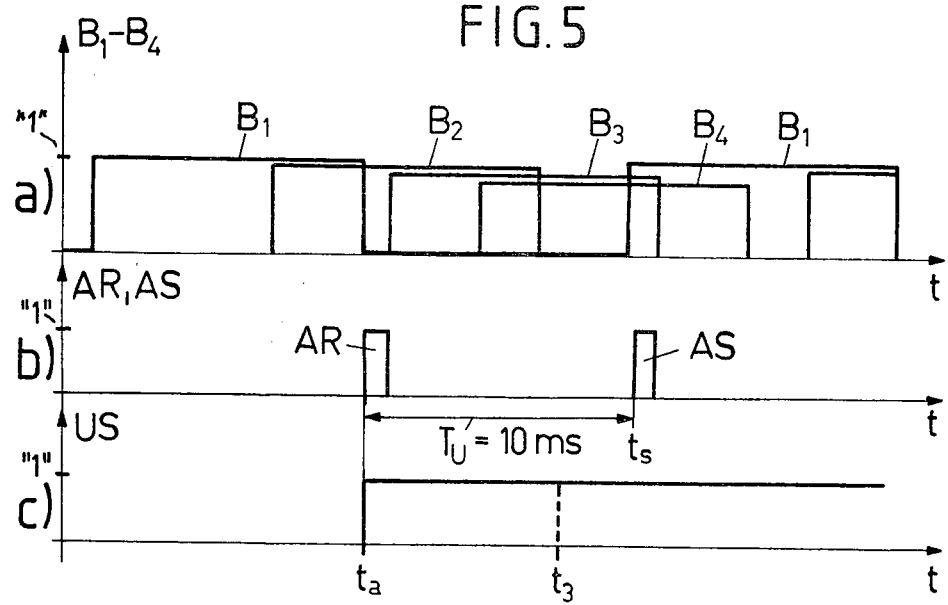

PROCESS AND DEVICE FOR SHORT-CIRCUIT MONITORING OF ELECTRICAL LINES

U.S. Pat. application Ser. No. 890,794 and U.S. Pat. application Ser. No. 953,788, filed Oct. 12, 1978, relate to similar subject matter by the same applicant herein.

The invention relates to a process for monitoring electric lines for short-circuits, in which detection signals dependent on the distance between the point of measurement and the point of short-circuit are formed, for one line phase at a time, from the line current and the line voltage, and in which the relative phase angles between detection signals following each other in time are compared in order to produce a triggering signal with a critical value of at least approximately 180°, with at least one difference signal between a reference impedance voltage and a line voltage as the detection signal. The invention further relates to a device for carrying out such a process, with a plurality of binary signal generators each allotted to a detection signal, especially a difference signal.

Disclosed is a process and a device by means of which a distance-dependent triggering, in the event of a short-circuit, is achieved on the basis of difference signals between reference impedance voltages and a line voltage, by simple phase angle monitoring. The means specifically mentioned are suitable for causing triggering within at most the duration of one period of the difference signals which have the mains frequency, that is to say at most 20 ms after excitation or after occurrence of the fault. In general, however, a shortening of the response time of the short-circuit monitoring system, that is to say of the abovementioned maximum time interval, is desirable. Accordingly, it is the object of the present invention to provide a short-circuit monitoring system with a maximum response time of less than the duration of one period, or of less than 20 ms.

The means whereby this object is achieved, according to the invention, utilize the same principle as in the copending U.S. application Ser. No. 890,794, but display applicability to detection signals of a general kind which, in their relative phase position, contain information regarding the distance of the short-circuit.

In principle the critical value monitoring of the relative phase angles of the detection signals can be effected separately for the positive and the negative halfwaves. This however is not an essential condition because the phase shifts—which of course agree as to the magnitude of the angle but are available for measurement at different points in time—of the positive half-waves relative to one another and of the negative half-waves relative to one another can be determined by means of a single signal, for example a binary signal, for each of the detection signals, with the positive and negative half-waves corresponding to the alternating values of the particular binary signal. Hence, such an embodiment represents a particularly advantageous further development of the invention, which also permits simple phase detection and evaluation by means of electronic digital technology.

Figure 2:
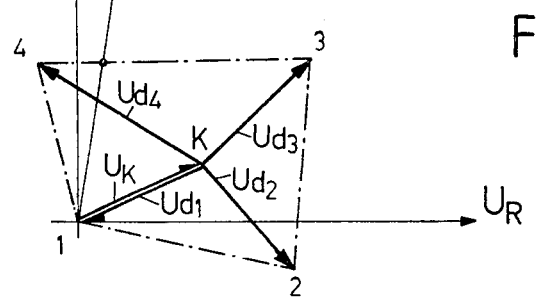
Figure 3:
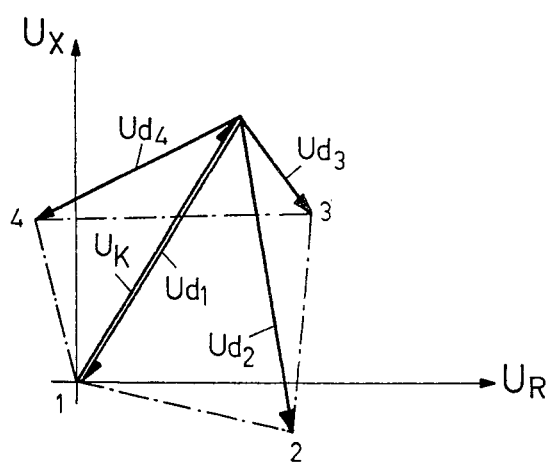
Figure 6:
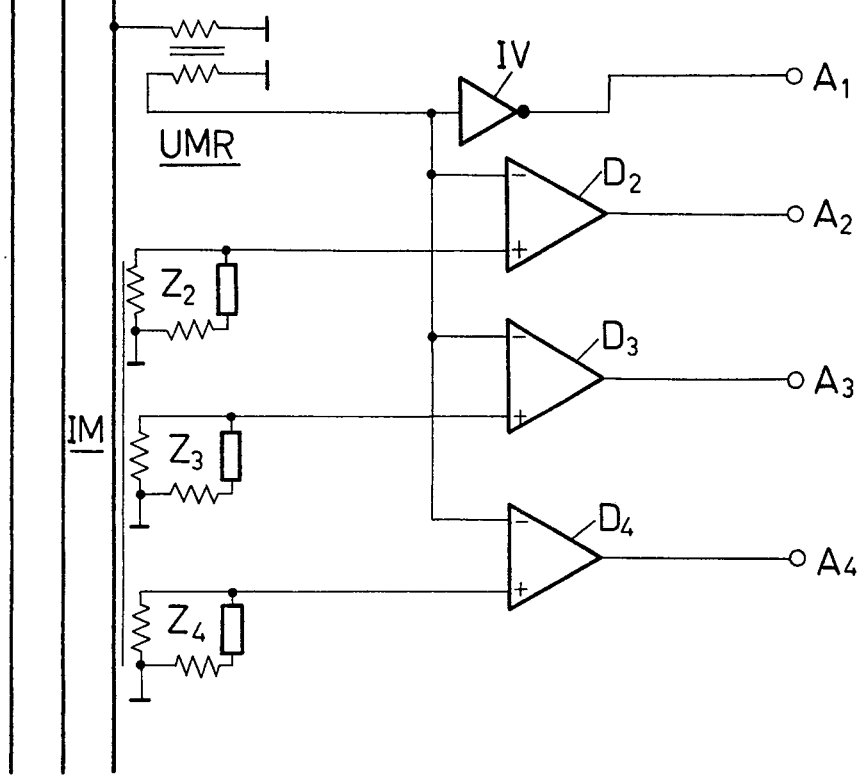
Figure 7:
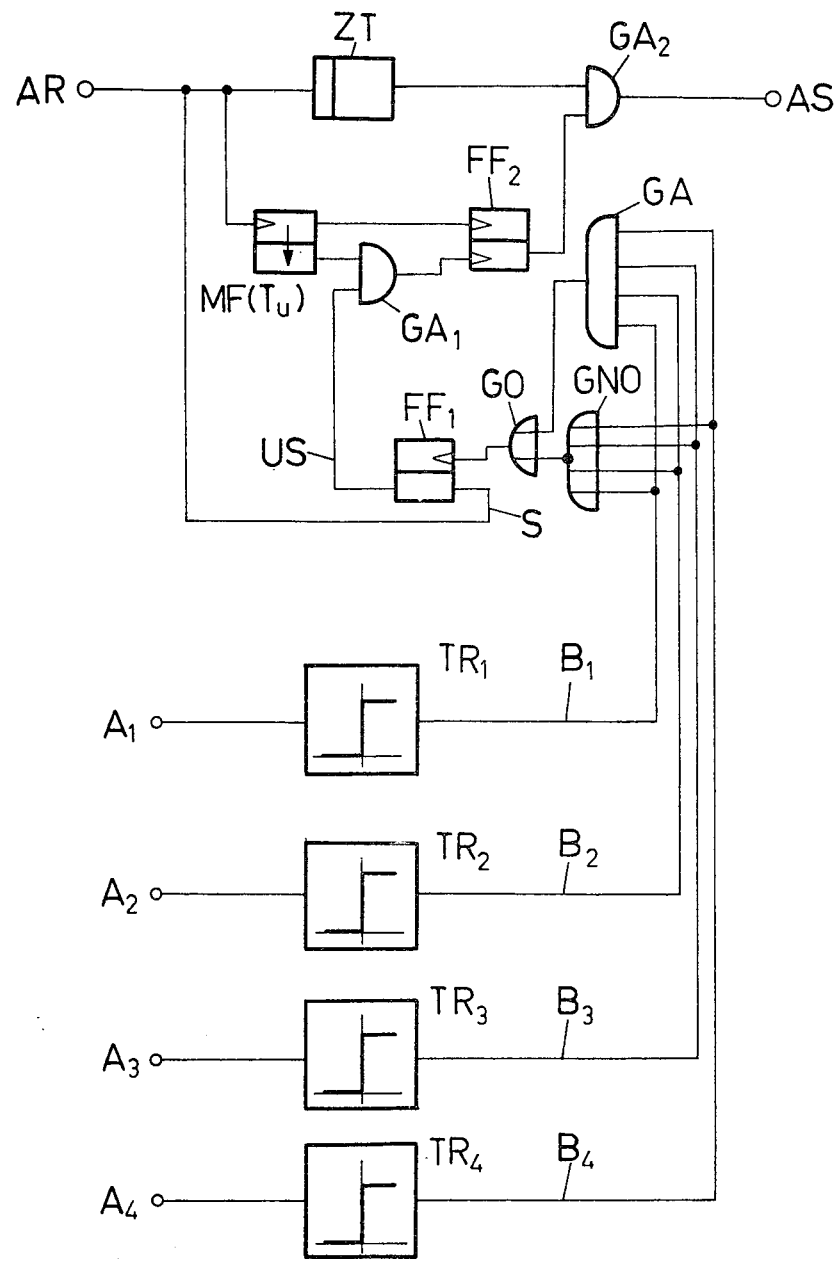

Further characteristics and advantages of the invention will be explained with the aid of the illustrative embodiments shown in the drawings. In the drawings:

FIG. 1 shows a vector diagram of image impedance voltages in the imaginary $U_X$-$U_R$ voltage plane for a square distance protection triggering zone, FIG. 2 shows a vector diagram of difference signals formed from the image impedance voltages according to FIG. 1 and a line voltage signal for a position of the latter within the triggering zone, FIG. 3 shows a vector diagram according to FIG. 2, but for a line voltage signal outside the triggering zone, FIG. 4 shows a signal/time diagram of the short-circuit monitoring for a line voltage signal outside the triggering zone, FIG. 5 shows a signal/time diagram for a line voltage signal within the triggering zone, FIG. 6 shows the measuring part of a short-circuit distance monitoring circuit which operates in accordance with the diagrams of FIG. 4 and FIG. 5 and FIG. 7 shows the circuit diagram of a digital phase angle monitoring device for positive and negative detection signal half-waves, for connection to the measuring part according to FIG. 6.

The vector diagram according to FIG. 1 shows a quadrilateral triggering zone with the corner points 1, 2, 3 and 4, with the corner point 1, for example, being at the origin of the coordinates, whilst the other corner points are determined by impedance reference voltages $U_2$, $U_3$ and $U_4$, formed in a manner customary per se. According to FIG. 2, using the line voltage signal $U_K$ obtained by measurement, there are then formed difference signals $Ud_2 = U_2 - U_K$, $Ud_3 = U_3 - U_K$ and $Ud_4 = U_4 - U_K$ and also a difference signal $Ud_1 = O - U_K$, which latter signal thus corresponds to the line voltage signal with reversed polarity and represents an additional reference signal which is included in the monitoring of the relative phase angles between all vectors starting from the tip of the vector $U_K$ and hence determines the origin of the coordinates, as the corner point 1. The difference signals represent a special case of detection signals which for example, can be derived in various ways known per se from reference or line reference impedances with the aid of the line current and the line voltage.

FIG. 2 shows, for a position of the vector tip of $U_K$ within the triggering zone that in this case none of the relative phase angles between detection signals succeeding one another in time exceeds the critical value of 180°. They only exceed this value if the vector tip of $U_K$ lies outside the triggering zone, as is indicated in FIG. 3.

FIG. 4, line (a), shows the binary signals $B_1$ to $B_4$ in the form of square-topped pulses which have been formed—for example by customary triggering—from the detection signals or difference signals $Ud_1$ to $Ud_4$. The time intervals during which the binary signals have the value "1" correspond, for example, to the positive half-waves of the detection signals, whilst the time intervals with the value "0" correspond to the negative half-waves. For a position of the vector tip of $U_K$ outside the triggering zone (see FIG. 3) there then result the conditions indicated in line (a) of FIG. 4, with an overlap of all positive half-waves between the time points $t_1$ and $t_2$, and with an overlap of all negative half-waves between the time points $t_3$ and $t_4$. These overlaps are converted into the disabling pulses indicated in lines (b) and (c) of FIG. 4 by means of the following logic operations:

$$GNO = \overline{(B_1 + B_2 + B_3 + B_4)} \tag{1}$$

$$GA = (B_1 \cdot B_2 \cdot B_3 \cdot B_4). \tag{2}$$

These disabling pulses, which for simplicity have been marked with the same reference symbols as the corresponding operations, namely GNO and GA, thus only occur if the position of the vector tip of $U_K$ is outside the triggering zone and are used, after an additional disjunctive operation (OR) for inhibiting the triggering in the event of an excitation by a short-circuit outside the protection zone. Since the disabling pulses, succeeding one another in time, are only separated from one another, in respect of their leading flanks and trailing flanks, by 10 ms, a correspondingly short detection interval or monitoring interval can be selected. This achieves the desired reduction of the response time to below 20 ms.

In FIG. 5, line (a), the binary signals $B_1$ to $B_4$ are shown for a position of the vector tip of $U_K$ within the triggering zone so that no inhibition can take place. In this case, as can be seen, there is no overlap of all positive or negative half-waves of the detection signals.

An excitation AR received, according to line (b) of FIG. 5, at time $t_a$ is used to switch on a monitoring signal US indicated in line (c), which, on the occurrence of a subsequent disabling pulse GNO or GA is set back to "0". This thus takes place after not more than 10 ms and, in the example shown, approximately at time $t_e$. On the other hand, if no disabling pulse is received US remains switched on and at the expiraton of a predetermined monitoring interval $T_U$, also of duration 10 ms, the triggering AS takes place at time $t_s$.

FIGS. 6 and 7 show a circuit for carrying out this procedure. The part-circuit shown in FIG. 6 comprises a line voltage measured value sensor UMR, connected to the phase R, here chosen as the example, of a three-phase line system R, S, T, the sensor being in the form of a voltage transformer, and a line current measured value sensor IM, also connected to phase R, in the form of a current transformer with three secondary windings, each of which subjects a reference impedance $Z_2$, $Z_3$ and $Z_4$ respectively, as a burden or apparent ohmic resistance, to a line current signal. Accordingly, the impedance reference voltages $U_2$, $U_3$ and $U_4$ respectively, already mentioned, appear across these impedances, whilst the line voltage signal $U_K$ appears directly at the secondary winding of UMR. Difference amplifiers $D_2$, $D_3$ and $D_4$ respectively are connected on the one hand to UMR and on the other hand to $Z_2$, $Z_3$ and $Z_4$ respectively and provide, at the outputs $A_2$, $A_3$ and $A_4$ respectively, the detection signals or difference signals $Ud_2$, $Ud_3$ and $Ud_4$. Furthermore, UMR provides, via an inverter IV, the signal $Ud_1 = -U_K$ at the output $A_1$. This thus provides the requisite detection signals.

The part-circuit shown in FIG. 7 serves for relative phase angle monitoring and is connected, by correspondingly marked inputs, to the outputs $A_1$ to $A_4$ of the part-circuit shown in FIG. 6. There follow binary signal generators in the form of triggers $TR_1$ to $TR_4$, which effect the previously mentioned conversion of the positive and negative half-waves of the detection signals into binary signals $B_1$ to $B_4$. To produce the disabling signals already discussed, these binary signals are fed in parallel to a NOR operation GNO and an AND operation GA. The outputs from these operations thus correspond to the disabling pulses indicated in lines (b) and (c) of FIG. 4. They are disjunctively linked in a subsequent OR operation GO and serve to switch back a flip-flop $FF_1$ which in the initial state is switched on via an input S as a function of an actuation AR. The output of $FF_1$ thus represents the previously mentioned monitoring signal US, which here inhibits a subsequent AND operation $GA_1$, whilst this operation remains prepared if $FF_1$ is not switched back, that is to say if an overlap of all positive or negative half-waves of the detection signals does not occur.

The actuation AR further triggers a monoflop MF, the switch-back time of which corresponds to the previously mentioned monitoring interval $T_U$. The triggering of MF at the start of the interval $T_U$ sets a second flip-flop $FF_2$. $FF_2$ is then reset when MF switches back, but only if the preparation of $GA_1$ has persisted at the end of $T_U$, that is to say in the case of triggering according to FIG. 5. The resetting of $FF_2$ prepares a further AND operation $GA_2$, so that the actuation AR is switched through as a trigger AS, at the end of the monitoring interval TU, via a time delay ZT employed to ensure reliable switching. In contrast, if $FF_1$ is reset before the end of the monitoring interval TU, it results in the disabling of $GA_1$ and hence in the non-resetting of $FF_2$ and the disabling of $GA_2$, so that no triggering occurs.

I claim:

1. A method for monitoring an electric line for short-circuits occurring within a predetermined distance from a measuring location at the line, in which line phase detection signals dependent on the distance between the measuring location and the short-circuit location are formed from the line current and the line voltage at the measuring location, and in which timewise immediately successive ones of said detection signals are subjected to a detection and comparison of their relative phase angles with a threshold value of at least approximately 180° to produce a triggering signal in the event of a short-circuit occurring within said predetermined distance, comprising the steps of:

(a) forming at least three reference signals proportional to the voltage drop across a reference impedance each caused by a line current signal applied to the respective reference impedance, said at least three reference signals defining a polygonal trigger region;

(b) forming from each of said reference signals a detection signal by forming the difference between a corresponding reference signal and a line voltage signal;

(c) subjecting positive and negative half-waves of said detection signals to said threshold value comparison to produce two binary signals; and (d) subjecting said two binary signals to a logical OR-operation to produce said triggering signal.

2. The method according to claim 1, wherein said positive and negative half-waves of the detection signals are converted to alternating values of corresponding binary signals and these binary signals are subjected to two logic operations, which are inverse to one another in respect of the input parameters, and the binary resulting signals of these operations are fed to an OR-operation.

3. Apparatus for monitoring an electric line for short-circuits occurring within a predetermined distance from a measuring location at the line, in which line phase detection signals dependent on the distance between the measuring location and the short-circuit location are formed from the line current and the line voltage at the measuring location, and in which timewise immediately successive ones of said detection signals are subjected to a detection and comparison of their relative phase angles with a threshold value of at least approximately 180° to produce a triggering signal in the event of a short-circuit occurring within said predetermined distance, comprising:
   a plurality of binary signal generators, each allotted to a detection signal, especially a difference signal;
   two logic circuit means for producing disabling pulses from the binary signals generated by said plurality of binary signal generators, the outputs of said generators being connected in parallel to the inputs of said two logic circuit means;
   said two logic circuit means having inputs inverse to one another; and
   a third logic circuit means, having its inputs connected to the outputs of said two logic circuit means, for producing a disabling signal indicative of the detection of a short-circuit.

* * * * *